United States Patent [19]

Masaki

[11] 4,180,410
[45] Dec. 25, 1979

[54] METHOD FOR PRODUCING A SILICON NITRIDE BASE SINTERED BODY

[75] Inventor: Hideyuki Masaki, Nagoya, Japan

[73] Assignee: Kabushiki Kaisha Toyota Chuo Kenkyusho, Nagoya, Japan

[21] Appl. No.: 905,912

[22] Filed: May 15, 1978

[30] Foreign Application Priority Data

May 14, 1977 [JP] Japan ................................. 52-55705

[51] Int. Cl.$^2$ ............................................. C04B 35/58
[52] U.S. Cl. ................................. 106/73.2; 106/73.5
[58] Field of Search ................. 106/73.2, 73.5, 39.5, 106/53

[56] References Cited

U.S. PATENT DOCUMENTS 4,043,381  8/1977  Mazdiyasni et al. .................. 106/73.2

FOREIGN PATENT DOCUMENTS 52-10462  3/1977  Japan ...................................... 106/73.2

*Primary Examiner*—James Poer
*Attorney, Agent, or Firm*—Blum, Moscovitz, Friedman & Kaplan

[57] ABSTRACT

A silicon nitride base sintered body having high strength and high density is formed by a normal sintering, namely by sintering without pressure. The sintered body is produced of silicon nitride and the metal oxides yttrium oxide and cerium oxide.

A silicon nitride base sintered body having yet a higher strength and higher density can be produced by heating yttrium oxide and cerium oxide together for forming $Y_2O_3 \cdot 2CeO_2$ before sintering.

24 Claims, No Drawings

METHOD FOR PRODUCING A SILICON NITRIDE BASE SINTERED BODY

BACKGROUND OF THE INVENTION

The present invention relates to a method for producing a silicon nitride base sintered body having high density and high strength.

Conventionally, a hot-press method has been employed to produce a silicon nitride base sintered body having high density and high strength. However, the hot-press method cannot be applied for the production of a sintered body having a complex profile. Also, although a sintered body having a complex profile can be obtained without the application of pressure during sintering, the strength of the resultant sintered body is lower than that of a body obtained by the hot-press method.

Accordingly, it has been sought in the industrial world to invent a unique method for producing a silicon nitride base sintered body of a complex profile having high density and high strength. The present invention is directed toward this need.

SUMMARY OF THE INVENTION

A silicon nitride sintered base body is produced from a composition consisting essentially of 65 to 90 mol % of silicon nitride powder and 4 to 35 mol % of yttrium oxide and cerium oxide powders, the mol ratio of said oxides ranging from 3:7 to 7:3. Preferably the mol ratio is 1:2. The powders are compacted into the desired profile and then sintered without application of pressure during the sintering step. Sintering is effected at 1700° C. to 1900° C. for 3–5 hours.

Preferably, the metal oxides are mixed and bound together with a binder prior to mixing with said silicon nitride. An even more preferable method step is heating the oxides together to convert same at least partially to the double oxide $Y_2O_3.2CeO_2$ and then crushing the product prior to mixing same with said nitride.

Accordingly, it is an object of the present invention to provide a method for producing silicon nitride base sintered body having high density and high strength without the application of pressure during sintering.

It is another object of the present invention to provide a method for producing a silicon nitride base sintered body of a complex profile at low cost.

A further object of the present invention is a composition for producing a silicon nitride base sintered body of high density and strength.

An important object of the invention is a silicon nitride base sintered body of high strength and density, said body containing yttrium and cerium either as the single or the double oxides or both.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

DESCRIPTION OF THE PREFERRED EMBODIMENTS

The present method belongs to the normal sintering method, that is sintering without the application of pressure. A powder mixture containing 65 to 96 mol % silicon nitride ($Si_3N_4$) with the remainder being metal oxides powder is used. The metal oxides consist of yttrium oxide ($Y_2O_3$) and cerium oxide ($CeO_2$), the composition ratio ranging from 30 to 70 mol % to 70 to 30 mol %.

By forming a compact from the mixed powder having the above-mentioned composition ratio by the normal method and then sintering the compact, a sintered body having a complicated profile can be obtained easily at low cost.

According to the method of the present invention, an excellent sintered body having high density and high strength can be obtained despite the use of the normal sintering method. It appears that in the practice of the present invention, $Y_2O_3.2CeO_2$ is produced from the above mentioned metal oxides and dissolves in the silicon nitride, in the solid phase, to promote the sintering operation of the silicon nitride. When the mol ratio of yttrium oxide to cerium oxide is 1:2, the effect of promoting the sintering of the silicon nitride is maximum. And even when the mol ratio of yttrium oxide to cerium oxide is out of said composition ratio and they are included as simple substances thereof, respectively they promote the sintering operation, too. Namely, in order to improve the property of a sintered body, it is sufficient that yttrium oxide and cerium oxide are both included in the sintered body as a part of the metal oxides to be added. When the content of yttrium oxide in the metal oxide powder is limited to 30 to 70 mol % of yttrium oxide with the remainder being cerium oxide, particularly good properties are observed in the obtained sintered body. When the content of silicon nitride in the powder mixture is below 65 mol % the strength of the obtained sintered body decreases due to the low strength of metal oxide. In compositions containing more than 96 mol % of silicon nitride, it becomes difficult to sinter the mixture powder; consequently, it is difficult to obtain a sintered body having low porosity and high strength.

In another method for obtaining a sintered body having a low porosity and high strength, a mixture of raw materials consisting of 65 to 96 mol % of silicon nitride and the aforementioned metal oxides as the remaining ingredients is used. The content of yttrium oxide in the metal oxides is from 30 mol % to 70 mol %. In this method, the metal oxides having the aforementioned composition ratio are mixed and sintered prior to mixing with the silicon nitride. After crushing, the sintered material is mixed with silicon nitride powder and then sintered as in the aforementioned method.

This method is characterized by forming $Y_2O_3.2CeO_2$ from $Y_2O_3$ and $CeO_2$. The porsity and strength of the silicon nitride base sintered body obtained by this method are superior to those of the sintered body which is produced by the aforementioned method. Namely, since according to the former method, silicon nitride particles are dispersed among the metal oxides for forming the mixed oxide compound, $Y_2O_3.2CeO_2$, in the composition, the mixed oxide compound is not formed efficiently in the sintering step. But according to this latter method, the $Y_2O_3.2CeO_2$ is first formed from the metal oxides, so that the solid solution thereof is easy to produce in the sintering step. Therefore, a compact sintered body having high strength can be easily produced.

In addition to the method of forming $Y_2O_3.2CeO_2$ by first heating yttrium oxide and cerium oxide there is another efficient method. Namely, a powder in which yttrium oxide powder is combined with cerium oxide powder by a bonding agent is prepared and then said powder is mixed with silicon nitride powder. Furthermore, it is clear that a compact sintered body having high strength can be obtained more easily by applying the mixed powder of the present invention to the hot press method. The following Embodiments exemplify the compositions, the methods and the products falling within the scope of the present invention.

Table 1, there are given measured results of silicon nitride base sintered bodies obtained from silicon nitride and yttrium oxide and silicon nitride and cerium oxide, as comparative data, the sample having the members 101 and 102.

TABLE 1

| Sample No. | Composition (mol %) | | | Sintering Temperature (°C.) | Porosity (%) | Bending Strength (Kg/mm$^2$) | Density (g/cm$^3$) |
|---|---|---|---|---|---|---|---|
| | Si$_3$N$_4$ | Y$_2$O$_3$ | CeO$_2$ | | | | |
| 1 | 90 | 5 | 5 | 1830 | 15.6 | 39.6 | 2.95 |
| 2 | 70 | 10 | 20 | 1800 | 11.0 | 30.9 | 3.11 |
| 3 | 65 | 15 | 20 | 1830 | 9.7 | 33.5 | 3.16 |
| 4 | 82 | 12 | 6 | 1830 | 9.7 | 31.1 | 3.16 |
| 5 | 82 | 6 | 12 | 1830 | 9.4 | 41.2 | 3.17 |
| 6 | 80 | 10 | 10 | 1700 | 16.0 | 31.0 | 2.94 |
| 7 | 65 | 20 | 15 | 1800 | 12.0 | 31.6 | 3.08 |
| 8 | 85 | 10 | 5 | 1870 | 12.8 | 37.9 | 3.05 |
| 9 | 65 | 20 | 15 | 1800 | 15.0 | 31.2 | 2.98 |
| 10 | 82 | 9 | 9 | 1830 | 13.0 | 36.4 | 3.05 |
| 11 | 91 | 5 | 4 | 1850 | 11.5 | 38.3 | 3.09 |
| 12 | 91 | 3 | 6 | 1850 | 9.4 | 41.1 | 3.17 |
| 13 | 90 | 3 | 7 | 1830 | 9.5 | 40.4 | 3.17 |
| 14 | 96 | 2 | 2 | 1850 | 15.3 | 34.7 | 2.98 |
| 101 | 76 | 24 | 0 | 1830 | 23.5 | — | 2.68 |
| 102 | 76 | 0 | 24 | 1830 | 20.8 | — | 2.77 |

EMBODIMENT I

Silicon nitride powder having a purity of 98% including 50% of β-type silicon nitride was used. After crushing into particles having a mean diameter of 3μ, the crushed silicon nitride powder was moist-mixed with yttrium oxide powder having a mean diameter of 4μ as a reagent of the first class on the market and cerium oxide powder having a mean diameter of 7μ as a reagent of the first class on the market in various composition ratios. The compositions were then ground in an alumina ball mill with 10% ethyl alcohol for 5 to 10 hours.

After drying thoroughly, each powder mixture was press-formed at a pressure of 500 kg/cm$^2$ into a rod-shaped compact of 50 mm×10 mm×6 mm. This compact was sintered for 3 to 5 hours at a temperature of 1700° C. to 1900° C. in a graphite mold in a nitrogen atmosphere. The surface of each obtained sintered body was ground in the direction parallel to the longitudinal axis of said body using a whetstone of 600 diamond to produce samples to be tested for bending strength and porosity.

Bending strength was measured by means of the Instron Model Universal Testing Instrument by the three-point supporting method, the span of the outer points being 30 mm, and the cross-head speed thereof being 0.5 mm/min. The porosity was calculated from the measured density, assuming that the true density of the silicon nitride base sintered body is 3.50 g/cm$^3$.

The composition ratio, sintering conditions and properites of each sample are shown in Table 1. Also, in As is apparent from Table 1, the silicon nitride base sintered bodies consisted essentially of 65 to 96 mol % of silicon nitride the remainder being a mixture of yttrium oxide and cerium oxide, the content of yttrium oxide in the mixture of metal oxides lying between about 30 and 70 mol %. The bodies of compositions within the scope of the invention showed a porosity of 9.4 to 16% and a bending strength of 30 to 41 kg/mm$^2$. These values are superior to those of the comparative data.

At sintering temperatures below 1700° C., it is difficult to obtain sintered bodies having a low porosity whereas at temperatures above 1900° C., a weight decrease was observed because of decomposition or sublimation of silicon nitride. The sintering process was not effective for sintering periods shorter than 3 hours; for a sintering period longer than 5 hours, the growth of particles of crystalline silicon nitride was observed. Accordingly, the preferred sintering period is from 3 to 5 hours for this Embodiment.

EMBODIMENT 2

Materials similar to those used in Embodiment 1 were employed. In this embodiment, yttrium oxide and cerium oxide were initially treated by the following method:

Yttrium oxide powder and cerium oxide powder were mixed in a PVA (polyvinyl alcohol) aqueous solution in a ball mill similar to that of Embodiment 1. After drying, mixtures were pulverized to particles, passing through a No. 325 mesh screen. The obtained powder mixture and silicon nitride powder were then dry-mixed for 10 hours by means of a mixer. This mixture was compacted and sintered in the same manner as that of Embodiment 1. Test results on bodies produced in accordance with this embodiment are shown in Table 2.

TABLE 2

| Sample No. | Composition (mol %) | | | Sintering Temperature (°C.) | Porosity (%) | Bending Strength (Kg/mm$^2$) | Density (g/cm$^3$) |
|---|---|---|---|---|---|---|---|
| | Si$_3$N$_4$ | Y$_2$O$_3$ | CeO$_2$ | | | | |
| 15 | 91 | 3 | 6 | 1850 | 8.4 | 44.5 | 3.20 |
| 16 | 90 | 5 | 5 | 1850 | 9.6 | 41.5 | 3.16 |

TABLE 2-continued

| Sample No. | Composition (mol %) | | | Sintering Temperature (°C.) | Porosity (%) | Bending Strength (Kg/mm²) | Density (g/cm³) |
|---|---|---|---|---|---|---|---|
| | Si₃N₄ | Y₂O₃ | CeO₂ | | | | |
| 17 | 91 | 6 | 3 | 1850 | 12.0 | 40.0 | 3.08 |

As is apparent from Table 2, the sintered bodies obtained by initially treating the metal oxides as mentioned above had higher strength and a lower porosity than those of samples shown in Table 1, although they had the same sintering conditions as those of samples prepared by the method of Embodiment I and shown in Table 1.

This improvement is considered to be due to the fact that since the metal oxides are joined with each other by the binder, namely PVA, before mixing with silicon nitride, the probability of silicon nitride particles being positioned between particles of the different metal oxides is smaller than is the case with the samples of Table 1, so that it becomes easier to form the mixed oxide compounds in the sintering step.

EMBODIMENT 3

Materials similar to those used in Embodiment 1 were used. Yttrium oxide and cerium oxide were treated by the following method:

The oxides were mixed in an aqueous solution in a ball mill similar to that used in Embodiment 1. After drying, the mixture was sintered at 1400° C. for six hours in a siliconit electric furnace. The resultant powder mixture was mixed with silicon nitride powder for 2 hours, after adding ethyl alcohol, in the afore-mentioned ball mill.

The powder mixture was then compacted and sintered in the same manner as that of Embodiment 1. Test results are shown in Table 3.

TABLE 3

| Sample No. | Composition (mol %) | | | Sintering Temperature (°C.) | Porosity (%) | Bending Strength (Kg/mm²) | Density (g/cm³) |
|---|---|---|---|---|---|---|---|
| | Si₃N₄ | Y₂O₃ | CeO₂ | | | | |
| 18 | 91 | 3 | 6 | 1850 | 6.2 | 59.4 | 3.28 |
| 19 | 90 | 5 | 5 | 1850 | 7.8 | 56.3 | 3.22 |
| 20 | 91 | 6 | 3 | 1850 | 8.6 | 51.0 | 3.18 |

As is apparent from Table 3, although compositions and sintering conditions of the method of Embodiment 3 are similar to those of Embodiment 2, the sintered bodies obtained by treatments in accordance with the Embodiment 3 method showed even higher strength and lower porosity than those of samples shown in Table 2. Examination by X-ray diffraction of the product obtained by the reaction of yttrium oxide with cerium oxide, showed that yttrium oxide, cerium oxide and compounds thereof were present. The analysis proved that in contacting surfaces of yttrium oxide particles and cerium oxide particles at 1400° C. for 6 hours, compounds were formed by the reaction of said metal oxides with each other; however, at such a low temperature, yttrium oxide and cerium oxide were not changed into Y₂O₃.2CeO₂ completely. It is considered that the reason why the sintered oxides of Embodiment 3 have higher strength and a smaller porosity than those of Embodiment 2 is that the compound Y₂O₃.2CeO₂ is more effective in promoting the sintering operation of silicon nitride than is either yttrium oxide or cerium oxide alone.

EMBODIMENT 4

Sintered bodies were produced by a method similar to that of Embodiment 3, except that the yttrium oxide and cerium oxide were initially heated at 1500° C. for 12 hours and that the heated body produced was pulverized to particles having a mean particle diameter of 5μ by the aformentioned ball mill and mixed with silicon nitride using ethyl alcohol for 6 hours within said ball mill. The measured results are shown in Table 4.

TABLE 4

| Sample No. | Composition (mol %) | | | Sintering Temperature (°C.) | Porosity (%) | Bending Strength (Kg/mm²) | Density (g/cm³) |
|---|---|---|---|---|---|---|---|
| | Si₃N₄ | Y₂O₃ | CeO₂ | | | | |
| 21 | 91 | 3 | 6 | 1830 | 2.0 | 70.0 | 3.43 |
| 22 | 90 | 5 | 5 | 1830 | 3.5 | 64.3 | 3.37 |
| 23 | 91 | 6 | 3 | 1830 | 4.8 | 61.1 | 3.36 |

As is apparent from Table 4, sintered bodies obtained by this method were superior in strength and density to those obtained by the method of Embodiment 3. X-ray diffraction of the sintered bodies obtained by the reaction of yttrium oxide and cerium oxide in which the mol ratio was 1:2, disclosed the presence only of Y₂O₃.2CeO₂.

Embodiment 5

α-Type silicon nitride power of 98% purity was prepared by nitriding commercial silicon powder, (the purity being 98%, the mean particle diameter being 5μ) in a stream of nitrogen gas. This silicon nitride powder was pulverized to a mean particle diameter of 1.5μ in ethyl alcohol in a ball mill similar to that used in Embodiment 1. The other materials and the other producing methods were the same as those of Embodiment 4. The measured results are shown in Table 5.

TABLE 5

| Sample No. | Composition (mol %) | | | Sintering Temperature (°C.) | Porosity (%) | Bending Strength (Kg/mm$^2$) | Density (g/cm$^3$) |
| --- | --- | --- | --- | --- | --- | --- | --- |
| | Si$_3$N$_4$ | Y$_2$O$_3$ | CeO$_2$ | | | | |
| 24 | 91 | 3 | 6 | 1830 | 1.7 | 78.0 | 3.44 |
| 25 | 90 | 5 | 5 | 1830 | 2.5 | 76.7 | 3.41 |
| 26 | 91 | 6 | 6 | 1830 | 4.6 | 69.4 | 3.27 |

As is apparent from Table 5, silicon nitride base sintered bodies prepared in accordance with the method of Embodiment 5 having properties superior to those of Embodiment 4 were obtained. It is considered that this good result is due to the fact that almost all silicon nitride powder used in the Embodiment 5 method was of the α-type (low temperature type).

As stated above in detail, the present invention relates to a method for producing a silicon nitride base sintered body consisting essentially of 65 to 96 mol % of silicon nitride and 4 to 35 mol % of metal oxides of yttrium oxide and cerium oxide. The mixed material powder is prepared by mixing silicon nitride and metal oxides containing 30 to 70 mol % of yttrium oxide with the remainder being cerium oxide, or by first heating the mixed metal oxides in a composition as above, pulverizing and mixing with silicon nitride powder.

Then, either of the two types of material powder is compacted by the conventional method and sintered in a non-oxidizing atmosphere. Thus, according to the present invention, sintered products of a complicated profile having very high density and strength can be obtained notwithstanding the use of the normal sintering method, namely sintering in the absence of applied pressure. Therefore, the method of the present invention is an industrially applicable method, presenting substantial advantages over conventional processes which require the use of hot-pressing for the sintering step.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for producing a silicon nitride base sintered body of high strength and density comprising the steps of
   combining essentially 65 to 96 mol % of silicon nitride powder and 4 to 35 mol % of metal oxides powder composed of yttrium oxide and cerium oxide, the mol ratio of said yttrium oxide to said cerium oxide ranging from 3:7 to 7:3,
   mixing said combined powdered materials,
   forming said powdered materials into a green compact and sintering said green compact in a non-oxidizing atmosphere without applying pressure.

2. The method according to claim 1, wherein said green compact is sintered in a nitrogen atmosphere at a temperature between 1700° and 1900° C. for 3 to 5 hours.

3. The method according to claim 1, wherein said green compact is formed at a pressure of about 500 kg/cm$^2$.

4. The method according to claim 1, wherein said silicon nitride powder particles have a mean diameter of 3μ.

5. The method according to claim 4, wherein said yttrium oxide powder and said cerium oxide powder have a mean diameter of 4μ and 7μ respectively.

6. The method according to claim 1, wherein said metal oxide powder is a compound powder consisting of yttrium oxide and cerium oxide.

7. The method according to claim 1, wherein said metal oxide powder is a bound powder of yttrium oxide powder and cerium oxide powder.

8. The method according to claim 1, wherein the ratio of yttrium oxide to cerium oxide, in mols, is 1:2.

9. The method according to claim 1, wherein the major portion of said silicon nitride is of the alpha type.

10. The method according to claim 1, further comprising the step of mixing said metal oxides with a binder and drying the resultant bound powder prior to said combining step.

11. The method according to claim 1, further comprising the step of heating said metal oxide powder prior to combining same with said silicon nitride, said metal oxide powder being heated to a temperature high enough and for a sufficiently long period to produce a quantity of a thermal reaction product effective in increasing the strength and density of said sintered body.

12. The method according to claim 8, further comprising the steps of heating said metal oxide powder to a temperature high enough and for a period long enough to convert same at least partially to Y$_2$O$_3$.CeO$_2$ prior to said combining step.

13. The method according to claim 12, wherein said metal oxide powder is heated to 1500° C. for 12 hours.

14. The method according to claim 1, further comprising the step of ball-milling said metal oxides powder in a liquid medium and drying the ball-milled powder prior to combining same with said silicon nitride powder.

15. The method according to claim 14, wherein said liquid medium contains a binder for said powder.

16. The method according to claim 15, wherein said binder is polyvinyl alcohol.

17. The method according to claim 14, further comprising the steps of heating said milled and dried powder to a temperature high enough and for a long enough period to convert at least a portion of said metal oxides to Y$_2$O$_3$.CeO$_2$, the quantity of said double oxide being great enough to yield an increase in the strength and density of said body, and crushing said heated metal oxide powder prior to combining same with said silicon nitride powder.

18. The method according to claim 17, wherein said heating step consists of heating said metal oxides powder at about 1400° C. for about six hours.

19. The method according to claim 17, wherein said metal oxide powder is heated to about 1500° C. for about 12 hours.

20. The method according to claim 19, wherein said heated metal oxide powder is crushed to a mean particle diameter of about 5µ and mixed with silicon nitride in a ball mill using a liquid medium.

21. The method according to claim 20, wherein said silicon nitride is principally of the alpha type.

22. A method of producing a silicon nitride base sintered body of high strength and density, comprising the steps of combining 65 to 96 mol % of silicon nitride powder with 4 to 35 mol % of metal oxide powder, compacting said powder mixture and sintering same without applying pressure at an effective temperature for a sufficient period of time to effect sintering, said metal oxide powder consisting of oxide of yttrium and cerium, the mol ratio of yttrium to cerium ranging from 3:7 to 7:3, said metal oxide being selected from the group consisting of yttrium oxide together with cerium oxide; yttrium oxide with cerium oxide and the thermal reaction product of yttrium oxide with cerium oxide; and the thermal reaction product of yttrium oxide with cerium oxide; said 4 to 35 mol % of said metal oxides being based on the individual unreacted oxides.

23. A composition suitable for production of a sintered body of high strength and density and complex profile by normal sintering, normal sintering being taken to means sintering without the application of pressure, said composition consisting essentially, except for minor impurities, of 65 to 96 mol % of silicon nitride and 4 to 35 mol % of yttrium oxide and cerium oxide in a range of mol ratios from 3:7 to 7:3 where the metals may be present as the single oxides, the double oxide $Y_2O_3 \cdot CeO_2$, or both.

24. A silicon nitride base body, comprising the thermal reaction product of 65 to 96 mol % of silicon nitride, and 4 to 35 mol % of yttrium oxide and cerium oxide in a ratio ranging from 3:7 to 7:3.

* * * * *